(12) United States Patent
Campbell (10) Patent No.: US 7,802,048 B2
(45) Date of Patent: Sep. 21, 2010

(54) SMART TRANSLATOR BOX FOR AGM-65 AIRCRAFT "MAVERICK" ANALOG INTERFACE TO MIL-STD-1760 STORE DIGITAL INTERFACE

(75) Inventor: Edward H. Campbell, Tucson, AR (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 12/210,480

(22) Filed: Sep. 15, 2008

(65) Prior Publication Data
US 2010/0070674 A1 Mar. 18, 2010

(51) Int. Cl.
G06F 13/36 (2006.01)
(52) U.S. Cl. .......................... 710/315; 701/3
(58) Field of Classification Search ................. 710/315; 701/3
See application file for complete search history.

(56) References Cited

U.S. PATENT DOCUMENTS

| | | | | |
|---|---|---|---|---|
| 5,614,896 | A * | 3/1997 | Monk et al. ............ | 340/945 |
| 6,122,569 | A * | 9/2000 | Ebert et al. ............ | 701/3 |
| 6,615,116 | B2 * | 9/2003 | Ebert et al. ............ | 701/3 |
| 6,941,850 | B1 * | 9/2005 | McMahon ............ | 89/1.811 |
| 7,137,599 | B1 * | 11/2006 | Sitzmann et al. ....... | 244/137.4 |
| 2003/0033059 | A1 | 2/2003 | Ebert et al. | |
| 2004/0205285 | A1 | 10/2004 | Kinstler | |
| 2005/0183570 | A1 | 8/2005 | McMahon | |

FOREIGN PATENT DOCUMENTS

| EP | 1001242 | 1/2007 |
|---|---|---|
| WO | 2005/106378 | 11/2005 |

* cited by examiner

Primary Examiner—Paul R Myers
(74) Attorney, Agent, or Firm—Eric A. Grifford (57) ABSTRACT

A smart translator "SMARTX" box provides an aircraft outfitted with an analog AGM-65 ("Maverick") interface with the same "look and feel" and capability to use a store outfitted with a digital MIL-STD-1760 interface as if the aircraft was fully 1760 compliant without any modifications to the electronics or software of either the aircraft or store.

16 Claims, 12 Drawing Sheets

STORE MAVERICK ANALOG INTERFACE

| SIGNAL | FUNCTION |
|---|---|
| 115V AC 400HZ<br>28V DC | SUPPLIES POWER TO SMARTX AND TO THE STORE. |
| TRACK, LAUNCH, UNCAGE, STATION SELECT, AGM-65 SELECT | DISCRETE INPUT SIGNALS ("HIGH" OR "LOW" ONLY), SOME CONTROLLED BY AIRCRAFT SOFTWARE AND SOME BY THE AIRCREW. IN VARIOUS COMBINATIONS THEY AUTHORIZE SMARTX TO BEGIN OPERATION AND TO INITIATE THE LAUNCH SEQUENCE, OR THEY INFORM SMARTX OF AN AIRCREW MENU SELECTION. |
| SLEW AZ<br>SLEW EL | VARIABLE ANALOG INPUT SIGNALS TYPICALLY CONTROLLED BY A CASTLE SWITCH ON THE HOTAS. THEY MOVE THE CURSOR UP OR DOWN THE DISPLAYED MENU ROWS, AND INCREMENT OR DECREMENT THE VALUE OF SELECTED DATA FIELDS, E.G. TARGET COORDINATES. |
| VIDEO | PROVIDES AN OUTPUT CHANNEL THAT ALLOWS SMARTX TO DIRECTLY CONTROL A VIDEO DISPLAY IN THE COCKPIT. SMARTX WILL DISPLAY A COMBINATION OF TEXT AND GRAPHICS DEPENDING ON MISSION CONTEXT AND AIRCREW SELECTION. |
| LCHR PRESENT, AGM-65 IDENT, MSL READY | DISCRETE OUTPUT SIGNALS THAT SMARTX CONTROLS SO AIRCRAFT SOFTWARE WILL BE SATISFIED THAT AN APPROVED STORE IS ATTACHED TO THE WING AND IS OPERATING CORRECTLY. MANIPULATION OF THESE SIGNALS VARIES BY PLATFORM TYPE. |

FIG. 5

| AIRCRAFT MIL-STD-1760 DIGITAL INTERFACE | |
|---|---|
| SIGNAL | FUNCTION AS SPECIFIED BY MIL-STD-1760 |
| 115V AC 400HZ 28V DC#1 | PROVIDES ELECTRICAL POWER TO THE STORE. |
| 28V DC#2 | PROVIDES ELECTRICAL POWER WHEN LAUNCHING A STORE. |
| MUX A & MUX B | TWO LOW-SPEED MULTIPLEXED SERIAL DATA BUSES (ONE IS REDUNDANT) FOR TWO-WAY COMMUNICATION WITH THE STORE. COMMUNICATION IS IN ACCORDANCE WITH THE MIL-STD-1553 COMMUNICATIONS PROTOCOL. OUTPUT: STORE STATUS, POSITION, LAR, INPUT: DATA & CONTROL COMMANDS. |
| UP FIBRE CHANNEL DOWN FIBRE CHANNEL | TWO HIGH-SPEED FIBRE CHANNEL SERIAL DATA CHANNELS THAT TOGETHER PROVIDE TWO-WAY COMMUNICATION WITH THE STORE. OUTPUT: STORE STATUS, POSITION, LAR, INPUT: DATA & CONTROL COMMANDS. |
| HIGH & LOW BANDWIDTH LINES | GENERAL PURPOSE TRANSMISSION LINES FOR ANALOG OR DIGITALS SIGNALS IN THE FREQUENCY RANGE 20 HZ TO 1.6 GHZ. SMARTX CAN CONNECT A STORE'S VIDEO OUTPUT ON THESE LINES DIRECTLY TO THE MAVERICK VIDEO CHANNEL. |
| RELEASE CONSENT | DISCRETE SIGNAL USED WHEN LAUNCHING A STORE. |
| INTERLOCK, INTERLOCK RETURN | DISCRETE SIGNALS THAT ALLOW SMARTX TO DETERMINE WHEN A STORE IS PHYSICALLY PRESENT, AND WHEN IT HAS BEEN LAUNCHED. |

SMART TRANSLATOR BOX FOR AGM-65 AIRCRAFT "MAVERICK" ANALOG INTERFACE TO MIL-STD-1760 STORE DIGITAL INTERFACE

BACKGROUND OF THE INVENTION

1. Field of the Invention

This invention relates to the integration of military stores outfitted with a digital MIL-STD-1760 interface with aircraft outfitted with an analog AGM-65 ("Maverick") interface, and more particularly to a smart translator "SMARTX" box that provides the aircraft with the same "look and feel" and capability to use the store as if the aircraft was fully 1760 compliant without any modifications to the electronics or software of either the aircraft or store.

2. Description of the Related Art

Fighter aircraft and the stores (e.g. bombs, missiles, launchers, targeting pod, data link etc.) which they carry have an electrical interface that provides for communication between the aircraft and store. U.S. and several foreign designed aircraft built after the early 1970s such as the A-4, AV-8, F-4, F-15, F-16, F-111 and so on include an AGM-65 ("Maverick") interface. Different aircraft and stores can have different instantiations of the Maverick interface e.g. the precise functions and signals may vary.

Figure 1:
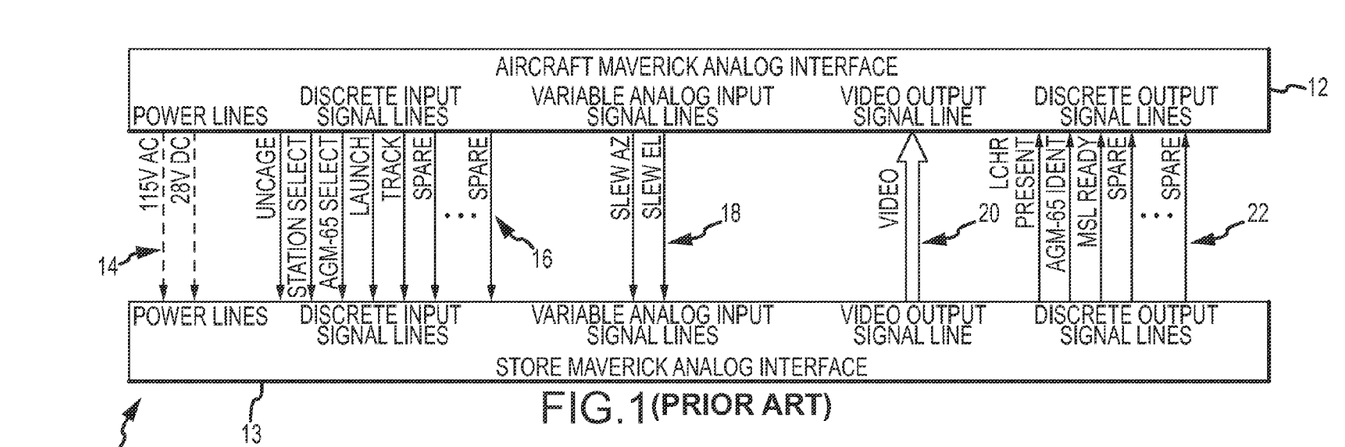
FIG. 1, as described above, is a functional diagram an aircraft-store analog AGM-65 ("Maverick") interface.

As shown in FIG. 1, the Maverick interface 10 includes an aircraft Maverick analog interface 12 on the aircraft and a store Maverick analog interface 13 on the store that are connected via a cable and Maverick connectors (not shown). The aircraft and store interfaces communicate via signals on power lines 14, discrete input signal lines 16 ("high" or "low" only), variable analog input signal lines 18, a video output signal line 20 and discrete output signal lines 22 ("high" or "low" only) where input and output are referenced to the store. The aircraft interface provides 3-phase, 400 Hz, 115V AC and 28V DC power on power lines 14 to power the store. The aircraft interface provides discrete signals such as uncage, station select, AGM-65 select, launch, track, spare . . . on discrete input signal lines 16, which change state depending on how the aircrew manipulates the Maverick controls. For example, pressing the Maverick "Track" button, typically located on the hands-on throttle and stick (HOTAS), momentarily causes the "track" signal to go high. The aircraft interface further provides two variable analog slew signals on analog input signal lines 18 that are used to slew the gimbaled seeker on the store in azimuth and elevation. The store interface receives analog video from the seeker (e.g. infrared sensed imagery) and transmits the video over video output signal line 20 where the video can be viewed by the aircrew in the cockpit. The store interface provides the discrete signals on discrete output signal lines 22 such as launcher present, AGM-65 identification MSL ready, spare etc. to the aircraft.

In the early 1990s, the U.S. Department of Defense promulgated MIL-STD-1760 that defines a digital interface, hardware and software for aircraft and stores. Newly produced tactical aircraft are internally wired with a 1760-compatible data bus for coupling to the MIL-STD-1760 standard store interface. Modern smart weapons such as the Joint Direct Attack Munition (JDAM), Joint Standoff Weapon (JSOW) or Enhanced Paveway are designed to communicate with the aircraft via such an interface to obtain control, monitor and release information to carry out mission critical operations.

Figure 2:
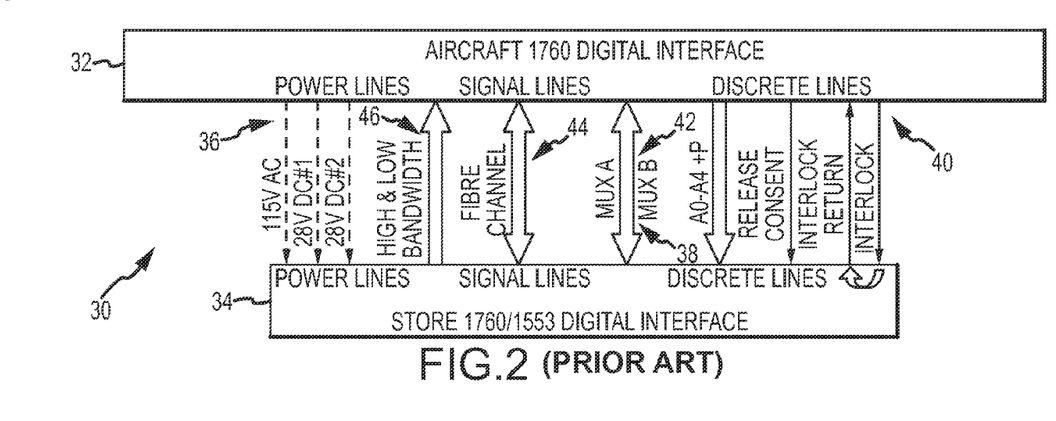
FIG. 2, as described above, is a functional diagram an aircraft-store digital MIL-STD 1760 interface.

As shown in FIG. 2, MIL-STD-1760 interface 30 includes an aircraft 1760 digital interface 32 on the aircraft and a store 1760 digital interface 34 that communicate via signals on power lines 36, signal lines 38 and discrete lines 40. 115V AC and 28V DC power is carried on power lines 36 to power the store. Release consent and interlock are carried on discrete lines 40 from the aircraft interface to the store, an interlock return is returned from the store. Release consent allows the store to be dropped or launched when commanded and interlock and interlock return indicate whether the store is present. The digital signals are communicated via a high speed 1760-compatible data bus. Currently, the data bus is a MIL-STD-1553 data bus 42 that includes Mux A and Mux B channels and address lines. Future stores will replace the 1553 data bus with fibre channel 44 that provides approximately 1000× the bandwidth of the current 1553 data bus. The standard interface supports having either or both the 1553 bus and the fibre channel. The store generates digital data such as store status and situational awareness including position, the launch acceptability region (LAR) etc. that is sent via the high speed data bus 42 or fibre channel 44 to the aircraft and displayed in the cockpit. The data is used by the aircraft computer to define various screens of text and graphics that the aircrew navigate to view store status, targeting information and control deployment of the store. The aircraft sends digital data and controls over the data bus to the store for IBIT, targeting and launch, for example. MIL-STD-1760 also specifies a high and/or low bandwidth lines 46 which comprise general purpose transmission lines for analog or digital signals in the frequency range of 20 Hz to 1.6 GHz.

The overwhelming majority of legacy aircraft in use today lack either the proper hardware and/or software to interface with the MIL-STD-1760 interface of modern stores. Economic and political constraints dictate that the lives of existing aircraft must be extended, making the incorporation of new 1760 stores into existing aircraft highly desirable if not necessary. Integration of new 1760 stores with legacy "Maverick" aircraft requires significant hardware and software modifications to the aircraft. Such modifications are both complex and costly to design and implement and may not provide the full functionality of the 1760 store.

SUMMARY OF THE INVENTION

The present invention provides a smart translator "SMARTX" box that provides an aircraft outfitted with an analog AGM-65 ("Maverick") interface with the same "look and feel" and capability to use a store outfitted with a digital MIL-STD-1760 interface as if the aircraft was fully 1760 compliant without any modifications to the electronics or software of either the aircraft or store.

The SMARTX box comprises (a) a Maverick mating connector for connection to a Maverick analog interface on an aircraft, (b) a MIL-STD-1760 mating connector for connection to a 1760 interface on a store, (c) a store AGM-65 analog interface including AC and DC power lines, a plurality of discrete input signal lines, a plurality of analog input signal lines, a plurality of discrete output signal lines and a video output signal line to communicate signals with the aircraft AGM-65 analog interface, (d) an aircraft MIL-STD-1760 digital interface including AC and DC power lines, signal lines including a 1760-compatible digital data bus and discrete lines to communicate control signals and data with the store MIL-STD-1760 digital interface, (e) means to pass the AC/DC power from the aircraft to the store and to power the SMARTX box, and (f) processor and I/O means to process signals from the aircrew and store to allow the aircraft to exploit the full capability of the 1760 store.

SMARTX reinterprets the aircraft's Maverick interface standard signal package on the discrete and analog input signal lines. SMARTX uses the discrete signal lines to transmit signals responsive to aircraft software and aircrew menu selection of a displayed video signal to authorize the smart translator box to operate, to initiate a launch sequence of the store or to communicate a menu selection. SMARTX interprets analog signals that vary in response to aircrew manipulation of a control mechanism (e.g. the HOTAS or cockpit switches) to scroll the menu or to increment or decrement the value of selected data fields on the menu. The processor processes these commands and status and situational awareness data from the store to produce a video signal of text and graphics via the store Maverick interface that is displayed to the aircrew in the cockpit to emulate the standard 1760 functionality. Next generation stores may be capable of generating the video signal and outputting the signal on high and/or low bandwidth lines provided for in the 1760 interface. The processor would be configured (via a software update) to recognize these stores and route the video directly to the video output signal line, disabling the generation of some or all of the video signal within SMARTX. The processor generates discrete signals via the store Maverick interface that communicate to the aircraft software that an approved store is attached and provide its operational status. The processor also generates digital data and discrete signals that are used to enable and control the store. The messages and timing embodied in the discrete signals sent to the aircraft and the discrete and digital signals sent to the store comply with the interface control documents (ICDs) specified for the Maverick and 1760 interfaces, respectively.

In an embodiment, a smart translator box integrates existing aircraft electronics and software configured for coupling to an AGM-65 interface with a store having a MIL-STD-1760 digital interface. The translator box includes a store AGM-65 analog interface including AC and DC power lines, a plurality of discrete input signal lines, a plurality of analog input signal lines, a plurality of discrete output signal lines and a video output signal line to communicate signals with the aircraft AGM-65 analog interface and an aircraft MIL-STD-1760 digital interface including AC and DC power lines, signal lines including a 1760-compatible digital data bus and discrete lines to communicate control signals and data with the store MIL-STD-1760 digital interface. A channel passes AC and DC power from the AC and DC power lines at the store AGM-65 analog interface to the AC and DC power lines at the aircraft MIL-STD-1760 digital interface to power the store and to power the smart translator box electronics. A discrete-to-digital converter converts signals on the discrete input signal lines at the store AGM-65 interface to aircraft digital signals, these signals being responsive to aircraft software and aircrew menu selection of a displayed video signal to authorize the smart translator box to operate, to initiate a launch sequence of the store or to communicate a menu selection. An analog-to digital converter converts signals on the analog signal lines at the store AGM-65 to aircraft digital signals, these signals being response to aircrew manipulation of a control mechanism to scroll the menu or to increment or decrement the value of selected data fields on the menu. A processor is configured to process the aircraft digital signals and the store control signals and data including store status and situational awareness to generate text and graphics digital signals, first control and data digital signals output on the 1760-compatible digital data bus and second and third control digital signals. A text and graphics video generator processes the text and graphics digital signals and generates a video signal on the store AGM-65 interface video output signal line that is displayed to the aircrew in the aircraft cockpit. A video switch may be included to port a store-generated video signal from the high and/or low bandwidth lines of the 1760 interface to the video output signal line for certain stores. A digital-to-discrete converter processes the second control digital signals to generate signals on the discrete output signal lines at the store AGM-65 interface, these signals communicating to the aircraft software that an approved store is attached and providing its operational status. A bi-directional digital-to-discrete converter processes the third control digital signals to generate release consent and interlock signals on the discrete lines at the aircraft MIL-STD-1760 compliant interface and processes a discrete interlock return signal to generate a digital interlock return signal communicated to the processor.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a smart translator "SMARTX" box that provides an aircraft outfitted with an analog AGM-65 ("Maverick") interface with the same "look and feel" and capability to use a store outfitted with a digital MIL-STD-1760 interface as if the aircraft was fully 1760 compliant without any modifications to the electronics or software of either the aircraft or store.

This is possible because the analog Maverick interface guarantees sufficient power and control authority to allow an aircrew to easily extract full functionality from any MIL-STD-1760 store controlled by SMARTX. Importantly, the Maverick interface provides a direct video channel to a cockpit display that SMARTX can use to display its own text and graphics. At a high level, SMARTX lies between the Maverick and MIL-STD-1760 interfaces and "translates" between them. Aircraft software believes that it is carrying and operating a Maverick store, and the weapon believes that it is being operated by a MIL-STD-1760 compatible aircraft.

Figure 3:
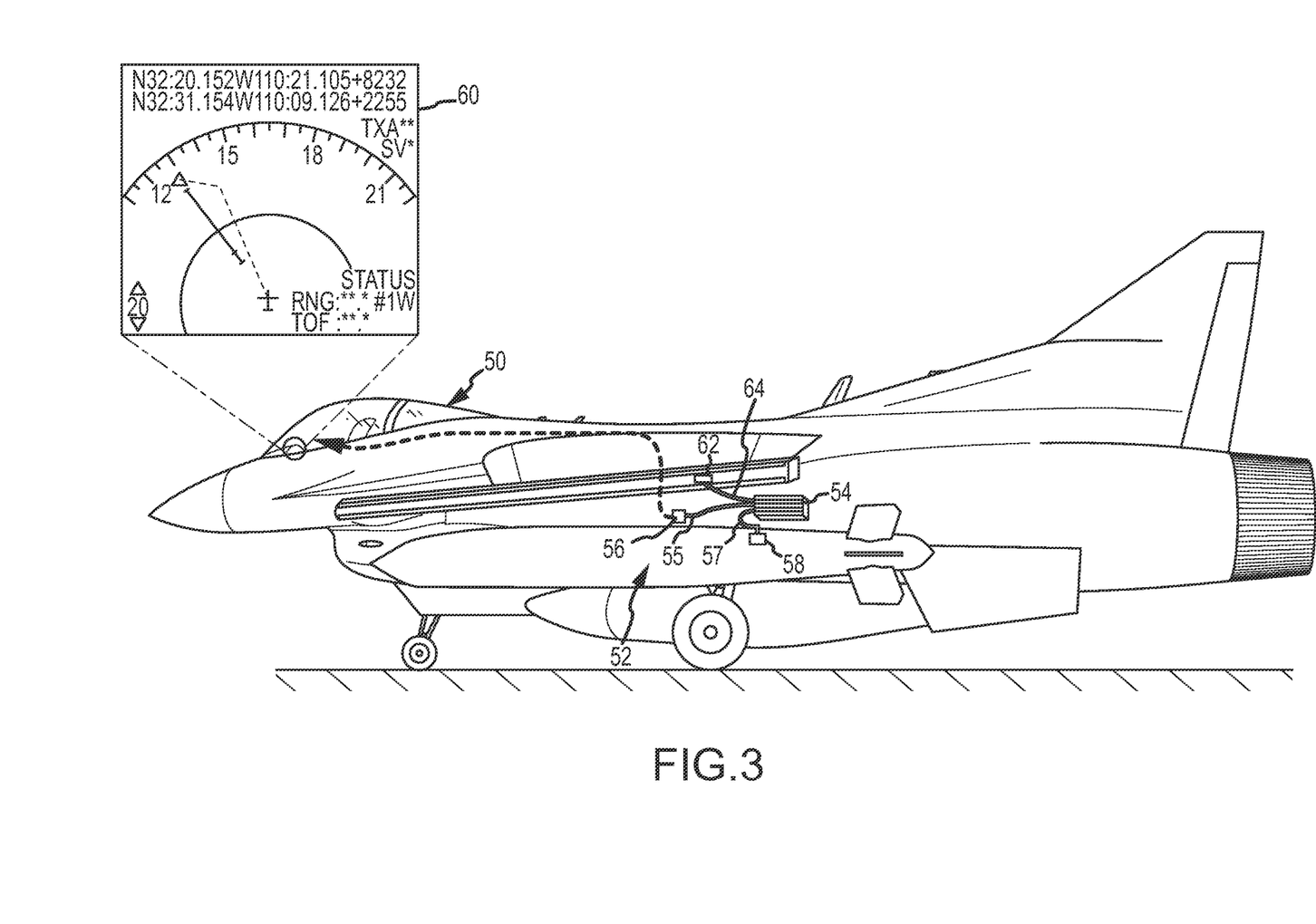
FIG. 3 is a diagram of an aircraft outfitted with an AGM-65 Maverick analog interface, a store outfitted with a MIL-STD-1760 digital interface, and a SMARTX box for translating signals between the two incompatible interfaces.

As shown in FIG. 3, an aircraft 50 having an aircraft AGM-65 analog interface is outfitted with one or more stores 52 each having a store MIL-STD-1760 digital interface. A SMARTX box 54 includes an umbilical cable 55 internally wired to a store AGM-65 analog interface and an AGM-65 mating connector 56 for connection to the Maverick launcher connector on aircraft 50 and an umbilical cable 57 internally wired to the aircraft MIL-STD-1760 digital interface and a MIL-STD-1760 mating connector 58 for connection to the MIL-STD-1760 compatible connector on store 52. Not shown is an optional SMARTX connection to the launcher ejection cartridges, used to automate the launch sequence for weapons carried on an ejection rack. The SMARTX box generates a video signal to display text and graphical displays 60 to the aircrew inside the cockpit to enable the full functionality of a 1760 aircraft and store. SMARTX is software controlled and can be programmed to implement the interface requirements of any MIL-STD-1760 compatible store, to include stores that conform to the Universal Armament Interface.

A GPS antenna 62 may be connected (optional) to a GPS navigation system inside the SMARTX box via umbilical cord 64. Most stores have an on-board GPS antenna and navigation system that can track GPS satellites and navigate while carried on the aircraft. For stores that are not OPS equipped, SMARTX offers an optional, built-in GPS navigation system. The navigation system is connected to GPS antenna 62, which is typically flush-mounted on an aircraft access panel located on top of the wing and near the pylon where SMARTX is installed. A GPS-equipped SMARTX box may be utilized with or without a store to provide GPS navigation, complete with moving map displays, to a non-GPS equipped aircraft.

Figure 4:
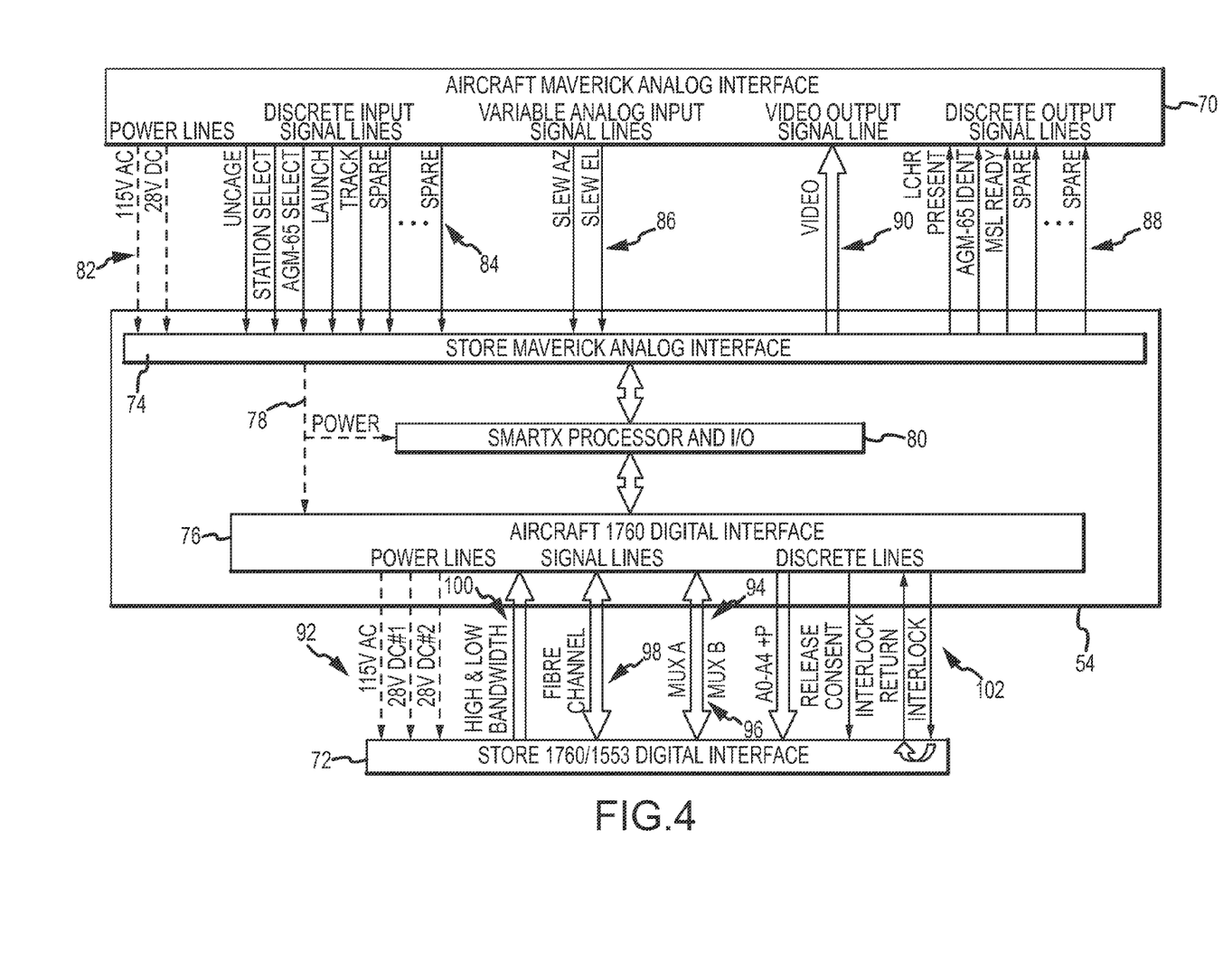
FIG. 4 is a functional block diagram of the SMARTX box.

As illustrated in FIG. 4, the SMARTX box 54 provides an aircraft outfitted with an aircraft AGM-65 ("Maverick") analog interface 70 with the same "look and feel" and capability to use a store outfitted with a store MIL-STD-1760 digital interface 72 as if the aircraft was fully 1760 compliant. The SMARTX box communicates with the aircraft AGM-65 analog interface 70 with signals specified by its interface control document (ICD) without modification to the aircraft's electronics or software and communicates with the store MIL-STD-1760 digital interface 72 with signals and data specified by its interface control document (ICD) without modification to the store's electronics and software to allow the aircraft to exploit the full capability of the store.

SMARTX box 54 includes a store AGM-65 analog interface 74, an aircraft MIL-STD-1760 digital interface 76, a channel 78 to pass AC and DC power from the AC and DC power lines at the store AGM-65 analog interface to the AC and DC power lines at the aircraft MIL-STD-1760 digital interface to power the store and to power the smart translator box electronics and processor and I/O means 80 to communicate with the aircraft AGM-65 interface with signals specified by its ICD and communicate with the store MIL-STD-1760 interface with signals specified by its ICD to allow the aircraft to exploit the full capability of the store. Store AGM-65 analog interface 74 includes AC and DC power lines 82, a plurality of discrete input signal lines 84, a plurality of analog input signal lines 86, a plurality of discrete output signal lines 88 and a video output signal line 90 to communicate signals with the aircraft AGM-65 analog interface 70. Aircraft MIL-STD-1760 digital interface 76 including AC and DC power lines 92, signal lines 94 including a 1760-compatible digital data bus e.g. a 1553 data bus 96 and/or a fibre channel 98 and high and/or low bandwidth lines 100 and discrete lines 102 to communicate control signals and data with the store MIL-STD-1760 digital interface 72.

Figure 5:
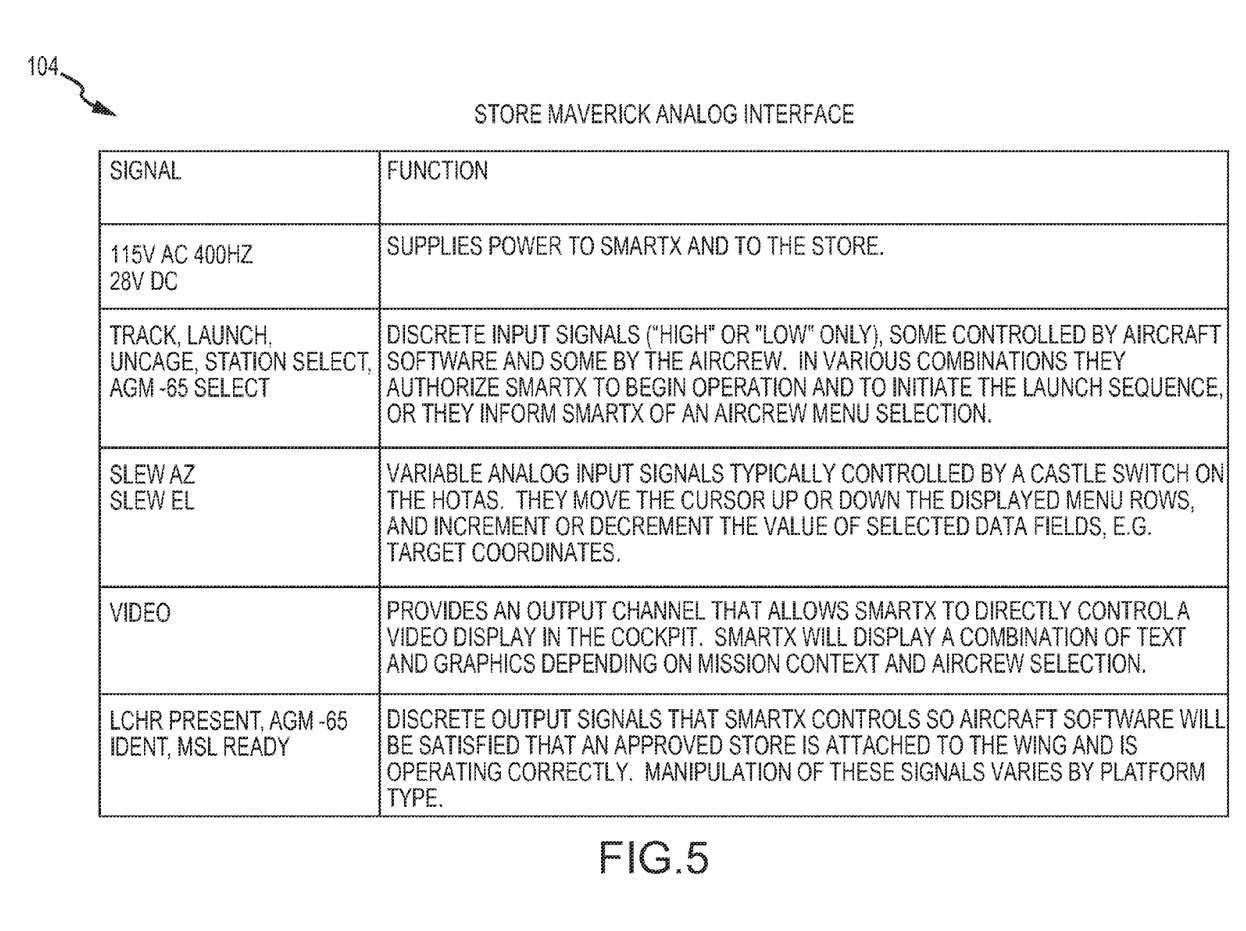
FIG. 5 is a table of the store Maverick analog interface.
Figure 6:
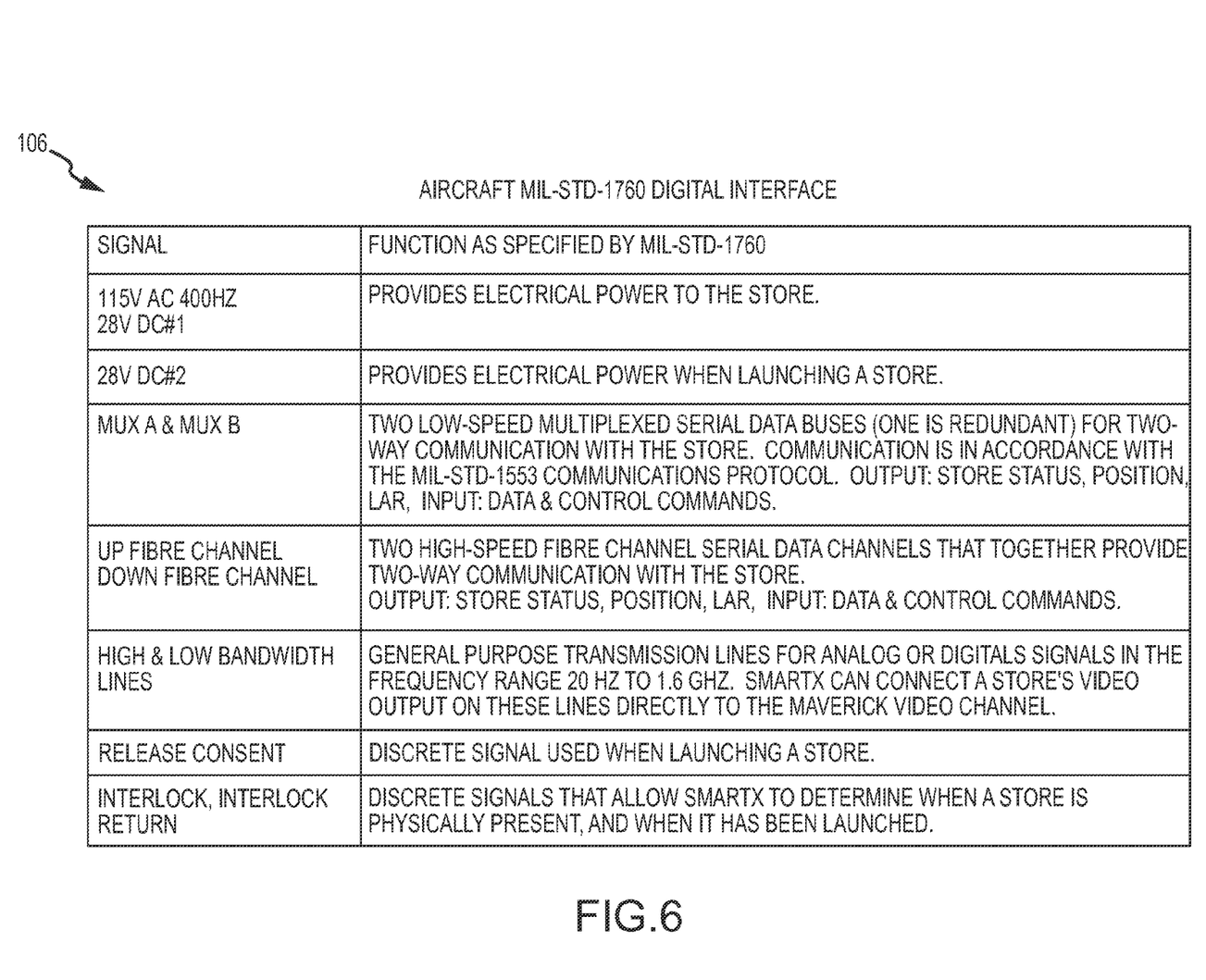
FIG. 6 is a table of the aircraft MIL-STD-1760 digital interface.

As depicted in FIGS. 5 and 6, tables 104 and 106 of signals at the store Maverick analog interface and at the Aircraft 1760 interface, respectively, the processor is configured to perform the following functions. The processor reinterprets the aircraft's AGM-65 analog interface standard signal package on the discrete and analog input signal lines. SMARTX uses the discrete signal lines to transmit signals responsive to aircraft software and aircrew menu selection of a displayed video signal to authorize the smart translator box to operate, to initiate a launch sequence of the store or to communicate a menu selection. SMARTX interprets analog signals that vary in response to aircrew manipulation of a control mechanism to scroll the menu or to increment or decrement the value of selected data fields on the menu. The processor processes these commands and status and situational awareness data from the store to produce a video signal of text and graphics via the store AGM-65 analog interface that is displayed to the aircrew in the cockpit to emulate the standard 1760 functionality. The processor generates discrete signals via the store AGM-65 analog interface that communicate to the aircraft software that an approved store is attached and provide its operational status. The processor generates digital data and discrete signals at the aircraft MIL-STD-1760 digital interface that are used to enable and control the store. The processor receives a return signal indicating if the store is physically present and when it has been launched.

Figure 7:
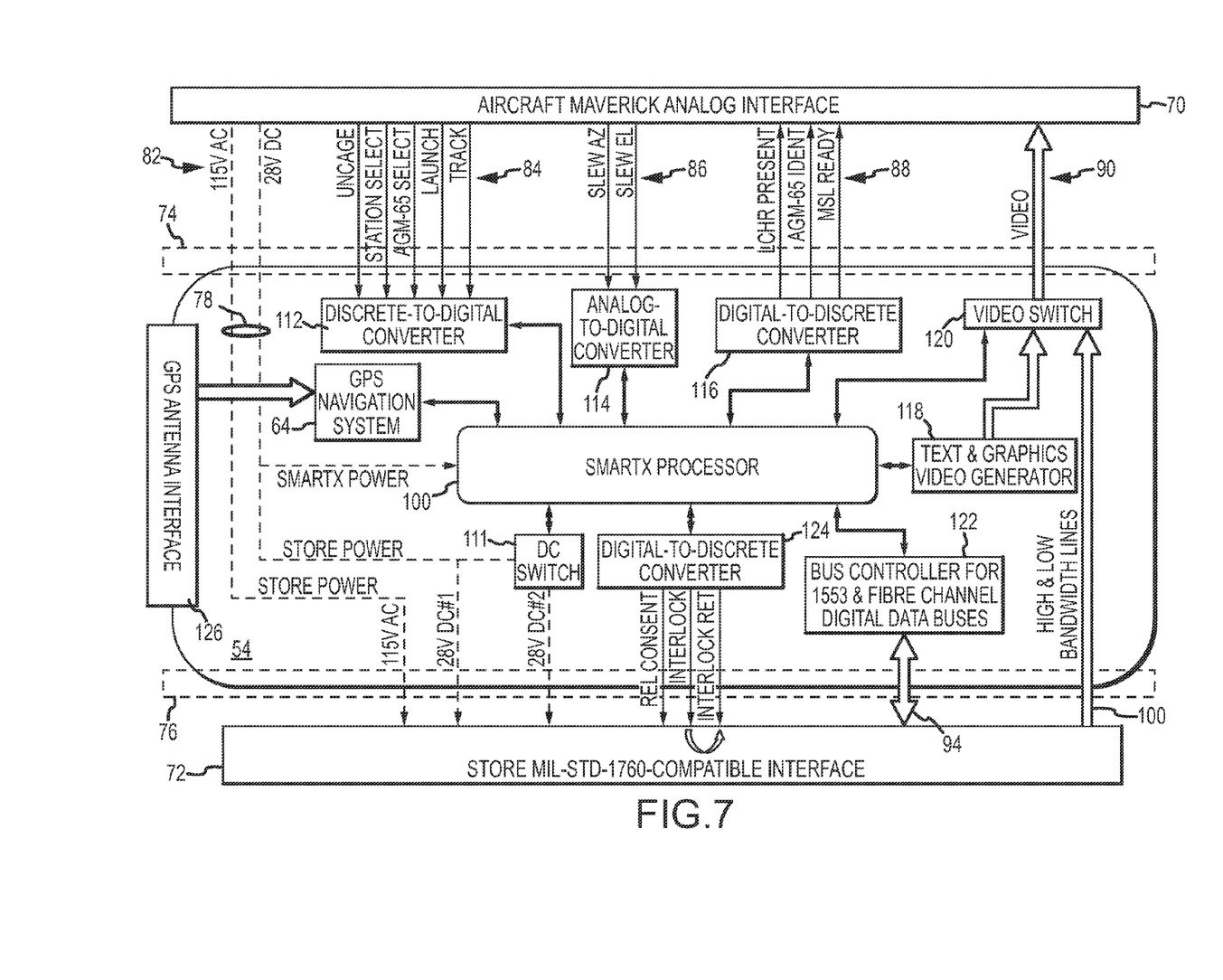
FIG. 7 is a hardware block diagram of the SMARTX box.

As illustrated in FIG. 7, in an embodiment SMARTX is a software-controlled "smart" translator box 54. All processing and control hardware and software reside within the "SMARTX Processor" 110. Note that this block diagram does not describe the physical layout of the SMARTX electronics. All functions shown may be consolidated in a single device. As shown, 115V AC and 28V DC operating power 82 is supplied from the aircraft via channel 78 to power both the SMARTX box 54 and the store. The processor controls a DC switch 111 to apply the 28V DC #2 signal to the store.

On the Maverick side of the diagram, the SMARTX Processor 110 manipulates signal lines 84, 86, 90 and 88 at store Maverick analog interface 74 to control a Discrete-to-Digital Convertor 112, an Analog-to-Digital (A/D) Converter 114, a text & graphics video generator 116, and a Digital-to-Discrete Converter 118, respectively. The Discrete-to-Digital Convertor 112 allows the SMARTX Processor 110 to determine the high/low state of each discrete input signal on signal lines 84. These signals being responsive to aircraft software and aircrew menu selection of a displayed video signal to authorize the smart translator box to operate, to initiate a launch sequence of the store or to communicate a menu selection. The A/D Converter 114 provides the SMARTX Processor with a digital representation of the analog voltage level of the two slew commands on signal lines 86, necessary to correctly manipulate the aircrew menu display e.g. scroll the menu or to increment or decrement the value of selected data fields on the menu. The video generator 116 provides the digital-to-video conversion required to drive the Maverick cockpit display. Depending on what data the SMARTX Processor supplies to the video generator, both text and graphics can be displayed, separately or together. Next generation stores may be capable of generating the video signal and outputting the signal on high and/or low bandwidth lines 100 provided for in the 1760 interface. The processor would be configured to recognize these stores and change the state of a video switch 120 to route the video directly to the video output signal line 90, disabling the generation of the video signal within SMARTX. The Digital-to-Discrete Convertor 116 allows the SMARTX Processor to correctly set the discrete output signals on signal lines 88 that convey Maverick status (e.g. store is attached and operational status) to the aircraft software.

On the store side, the SMARTX Processor 100 controls a MIL-STD-1760 compliant serial data bus controller 122 for digital communications with the store over signal lines 96. Both MIL-STD-1553 and fibre channel communication are supported. For each store, SMARTX is programmed to implement the store's interface control document (ICD), which specifies the 20-30 messages typically required to correctly operate the store. During launch, the SMARTX Processor controls a bi-directional digital-to-discrete converter 124 to produce the 1760 Discrete Signals e.g. release consent and interlock and interlock return, to correctly implement the store's ICD-specified launch protocol.

As described previously, SMARTX box may optionally include GPS navigation system 64 that is connected to a GPS antenna via a GPS antenna interface 126. Most stores have an on-board GPS antenna and navigation system that can track GPS satellites and navigate while carried on the aircraft. For stores that are not GPS equipped, SMARTX offers an optional, built-in GPS navigation system. The navigation system is connected to GPS antenna 62, which is typically flush-mounted on an aircraft access panel located on top of the wing and near the pylon where SMARTX is installed. The processor may pass GPS navigation data to the store, which in turn computes the LAR that is than returned to SMARTX as part of the situational awareness data. Alternately, the processor may compute the LAR itself for "dumb" stores that only provide status data. A GPS-equipped SMARTX box may be utilized with or without a store to provide GPS navigation, complete with moving map displays, to a non-GPS equipped aircraft.

As illustrated in FIGS. 8-13, the aircrew uses standard Maverick controls to scroll through store-specific menu options, enter data, and command various store functions. SMARTX provides these menus to the aircrew on the aircraft's dedicated Maverick display, and interprets the aircrew's use of standard Maverick controls to perform several functions:

Move the display cursor (typically a row of text highlighted in reverse contrast) up and down, or where permitted left and right, through the series of menus displayed by SMARTX. In the notional SMARTX displays shown in this document, four menu selections are provided: ERASE MISSION DATA, MSD, TARGET DATA, and WEAPON IBIT. Once a function is selected, SMARTX uses the store interface (as defined in its ICD) to command the selected function, and to provide interim status and final results as required.

When commanded, provide a scalable mission status display (MSD) that shows the store launch solution, called the launch acceptability region (LAR). The LAR is typically computed in the store based on the store's knowledge of current position, altitude, attitude (pitch/yaw/roll), airspeed, and target location, along with associated target attack parameters like impact angle and impact bearing.

This dynamic display shows the present position of the platform and the target, and a graphical representation of the size and position of the LAR. The LAR grows and shrinks as the platform turns towards or away from the target, gains or loses altitude, and so on. When the aircrew maneuvers the platform inside the LAR, the store can be launched and will reach its target. Some stores compute their own LAR, and SMARTX will perform the calculations for those that don't.

When commanded, initiate the store launch sequence. The aircrew typically commands launch by pressing the Maverick "pickle" button. Platform software then sets the appropriate discrete input signals to command a Maverick launch. SMARTX monitors these signals and performs the correct sequence of events to launch the store, whether by rail or ejection rack. SMARTX monitors the store interface during launch and reports back either a successful launch or a hung store.

Figure 8:
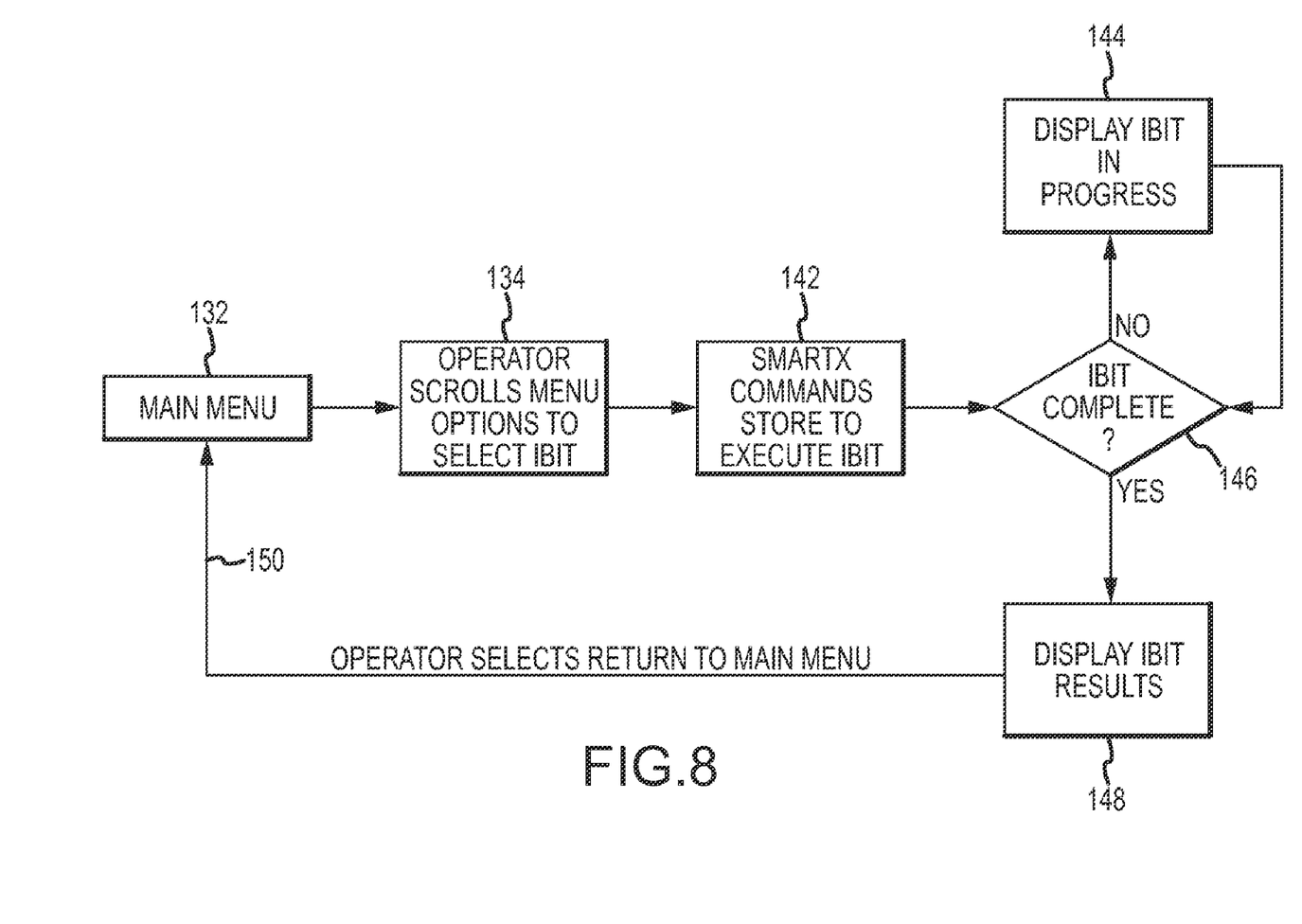
FIGS. 8 and 9 are flow diagrams illustrating a notional sequence of events an aircrew undertakes to command the store to perform an IBIT self-test.
Figure 9:
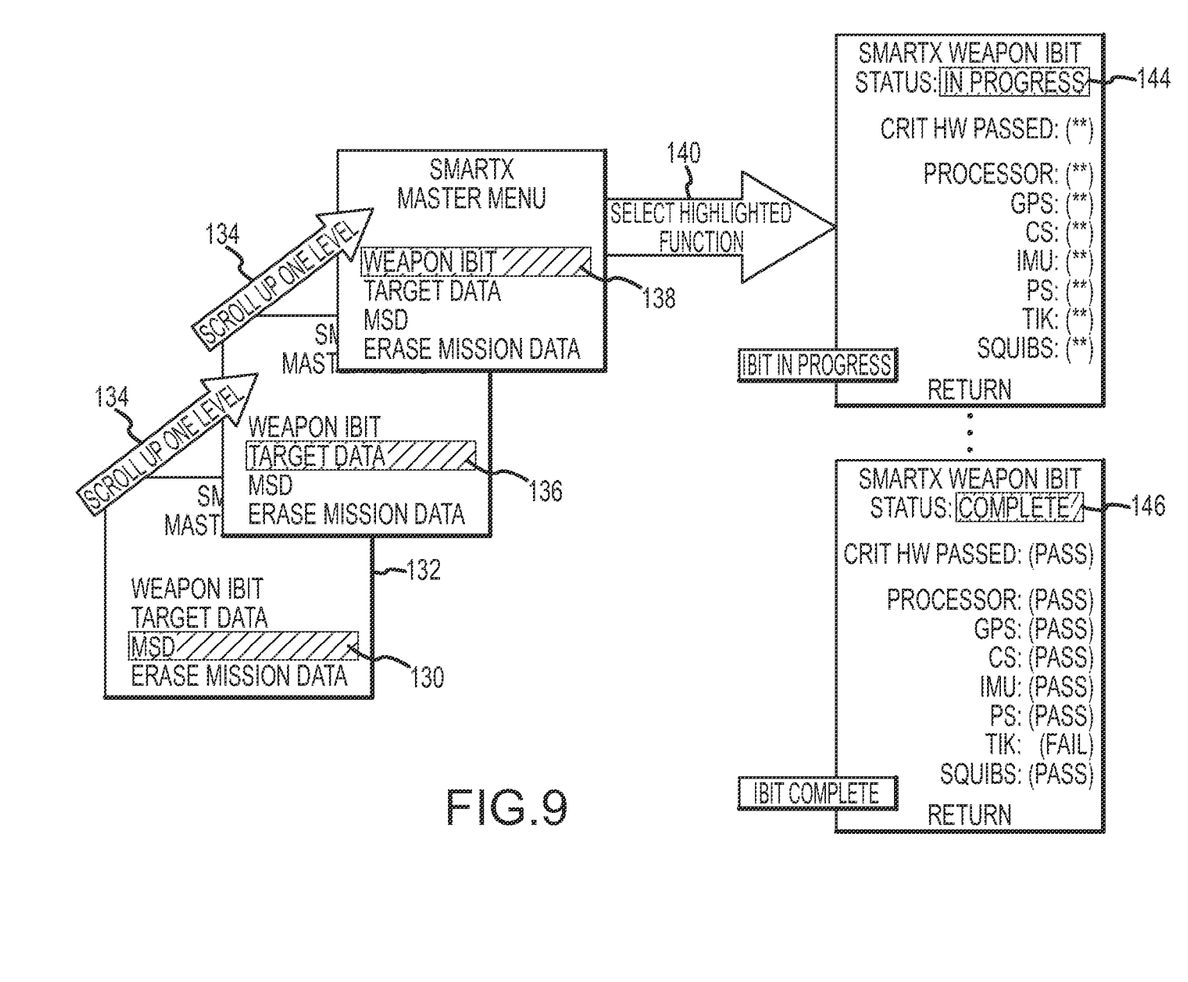

FIGS. 8 and 9 illustrate a notional sequence of events the aircrew must undertake to command the store to perform an Initiated Built-In Test (IBIT). The starting condition is with the cursor resting on the MSD menu option 130 on the main menu 132. Assuming the "scroll up" function is implemented on the HOTAS castle switch, the aircrew member "rocks" the switch up two times 134 (SMARTX detects the changes in value of the Slew EL signal) with his or her thumb, causing SMARTX to move the cursor from MSD to TARGET DATA 136 to WEAPON IBIT 138. Pressing the "Track" button with a forefinger selects the highlighted function 140. SMARTX detects the change in the Track signal from low to high, commands the store to enter IBIT 142, and changes the cockpit display to an IBIT status display that shows IN PROGRESS 144. When the store indicates that IBIT is complete (typically 20 seconds or longer), SMARTX updates the status display to indicate COMPLETE 146, and to show the pass/fail status of each of the store's tested subsystems 148. The number and type of tested subsystems vary by store. The aircrew member must rock the castle switch down one time to move the cursor to RETURN, and then press the Track button to return 150 to the main menu.

Figure 10:
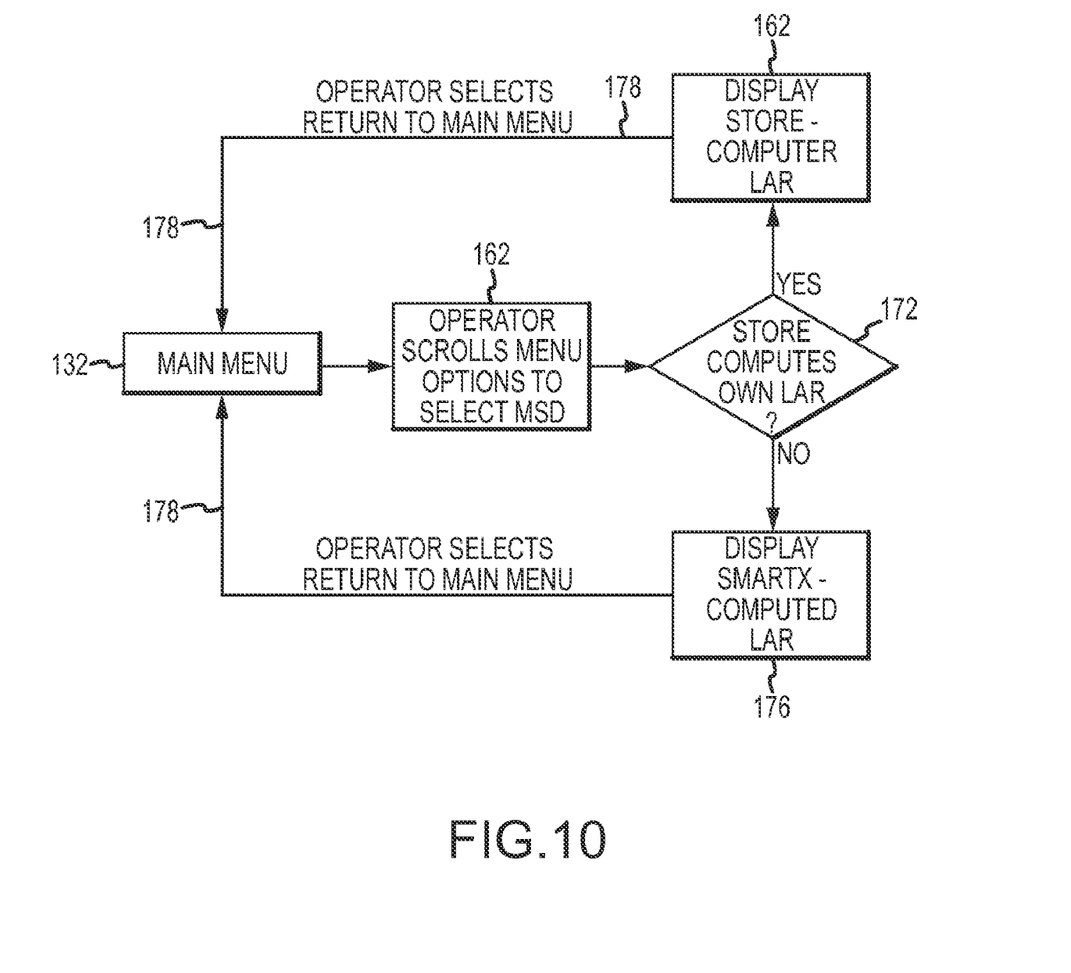
FIGS. 10 and 11 are flow diagrams illustrating a notional sequence of events an aircrew undertakes to display the mission status display (MSD)
Figure 11:
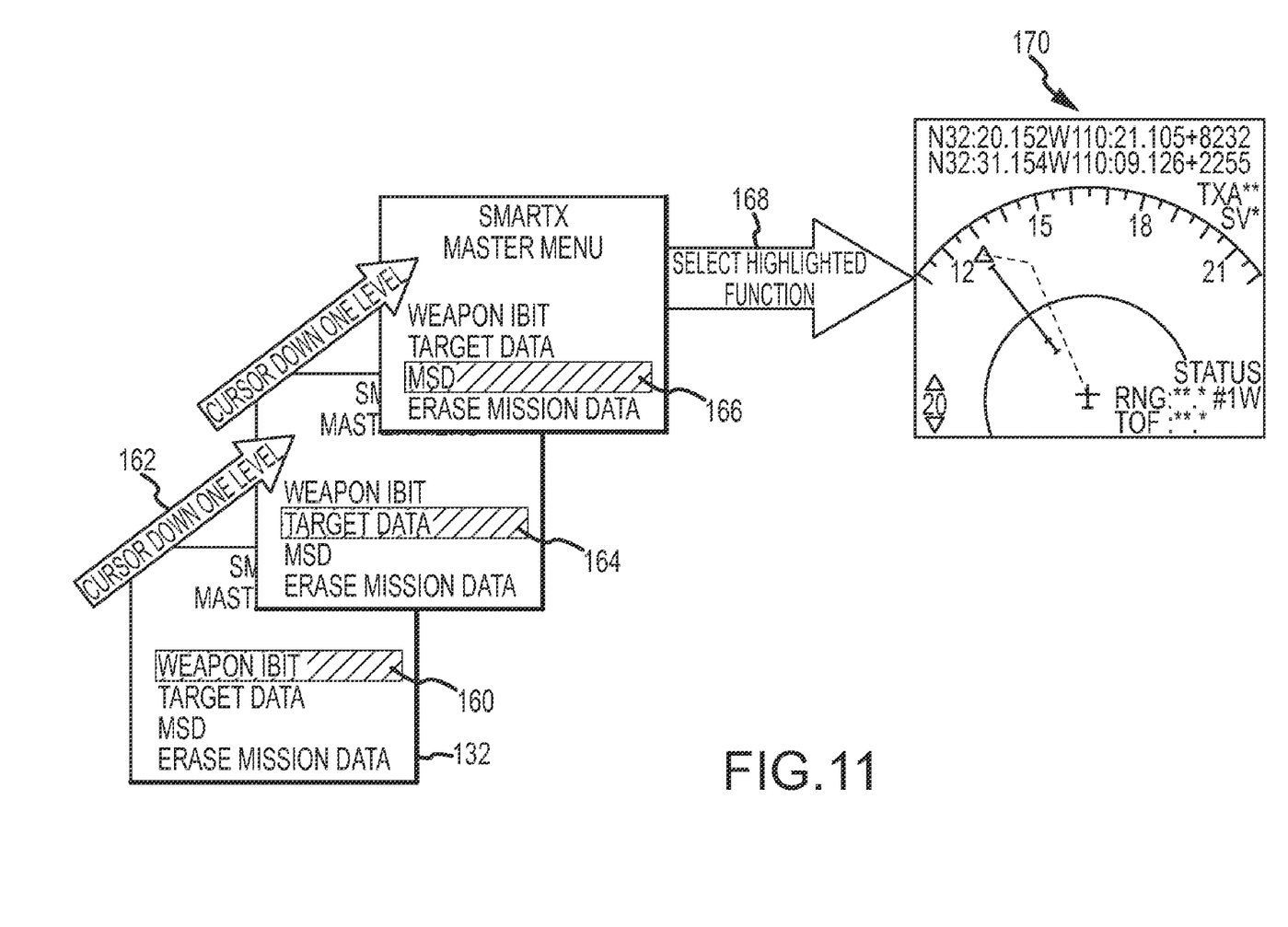

FIGS. 10 and 11 illustrate the notional sequence of events the aircrew must undertake to display the mission status display (MSD). The starting condition is with the cursor resting on the WEAPON IBIT menu option 160 on the main menu 132. Assuming the "scroll down" function is implemented on the HOTAS castle switch, the aircrew member "rocks" the switch down two times with his or her thumb 162, moving the cursor from WEAPON IBIT to TARGET DATA 164 to MSD 166. Pressing the "Track" button with a forefinger selects the highlighted function 168. SMARTX detects the change in the Track signal from low to high, and produces the MSD display 170, which is constructed by continuously polling a variety of store messages including the launch acceptability region (LAR) message. SMARTX determines whether the store computes its own LAR 172. If so, SMARTX displays the store-computed LAR 174. If the store does not compute its own LAR, the SMARTX performs the function using algorithms provided by the store contractor and displays the SMARTX-computed LAR 176. The MSD display is dynamic and responds to changes in aircraft position, attitude and airspeed. Pressing the Track button returns 178 the user to the main menu 132.

Figure 12:
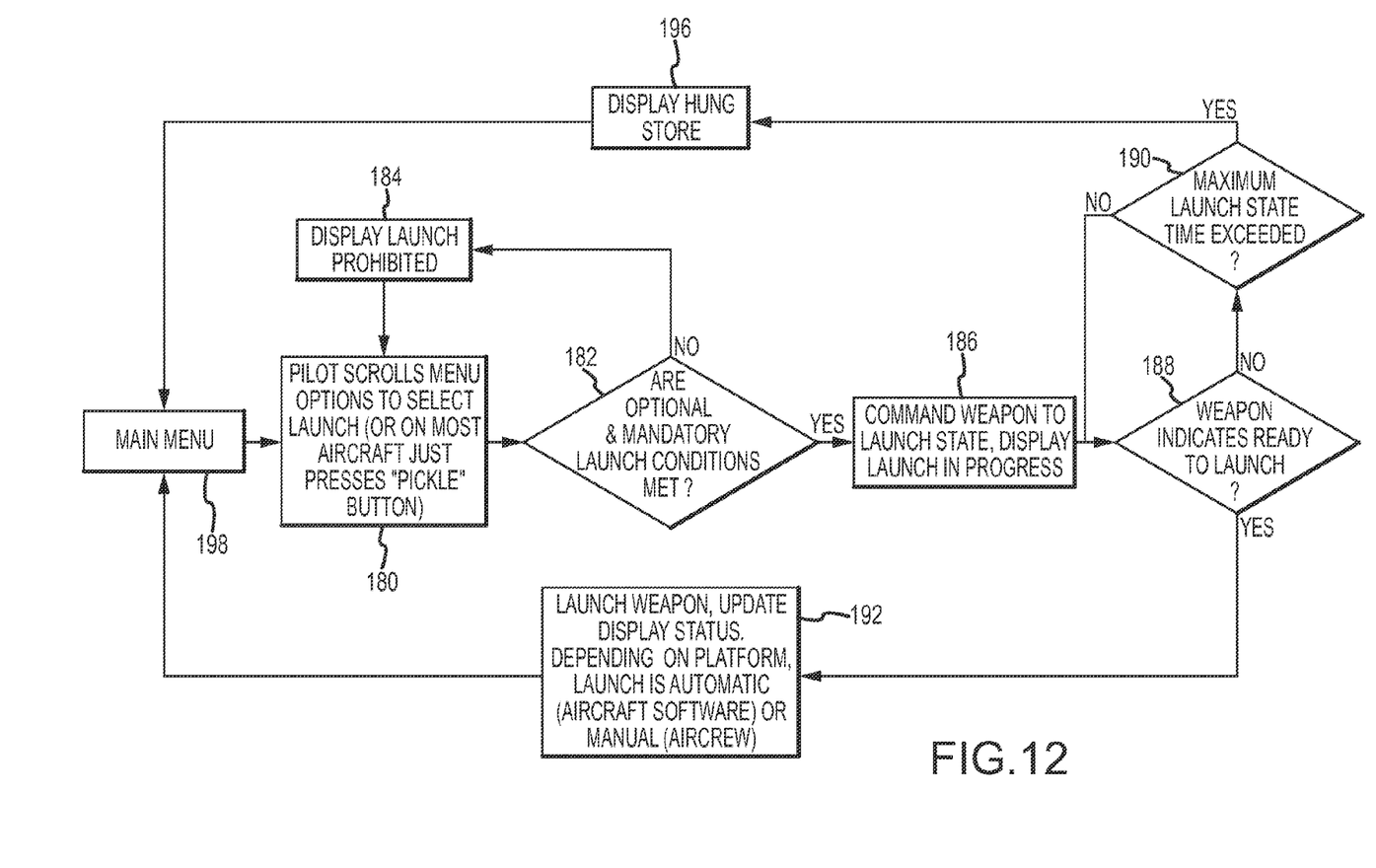
FIGS. 12 and 13 are flow diagrams illustrating a notional sequence of events an aircrew must undertake to launch the store.
Figure 13:
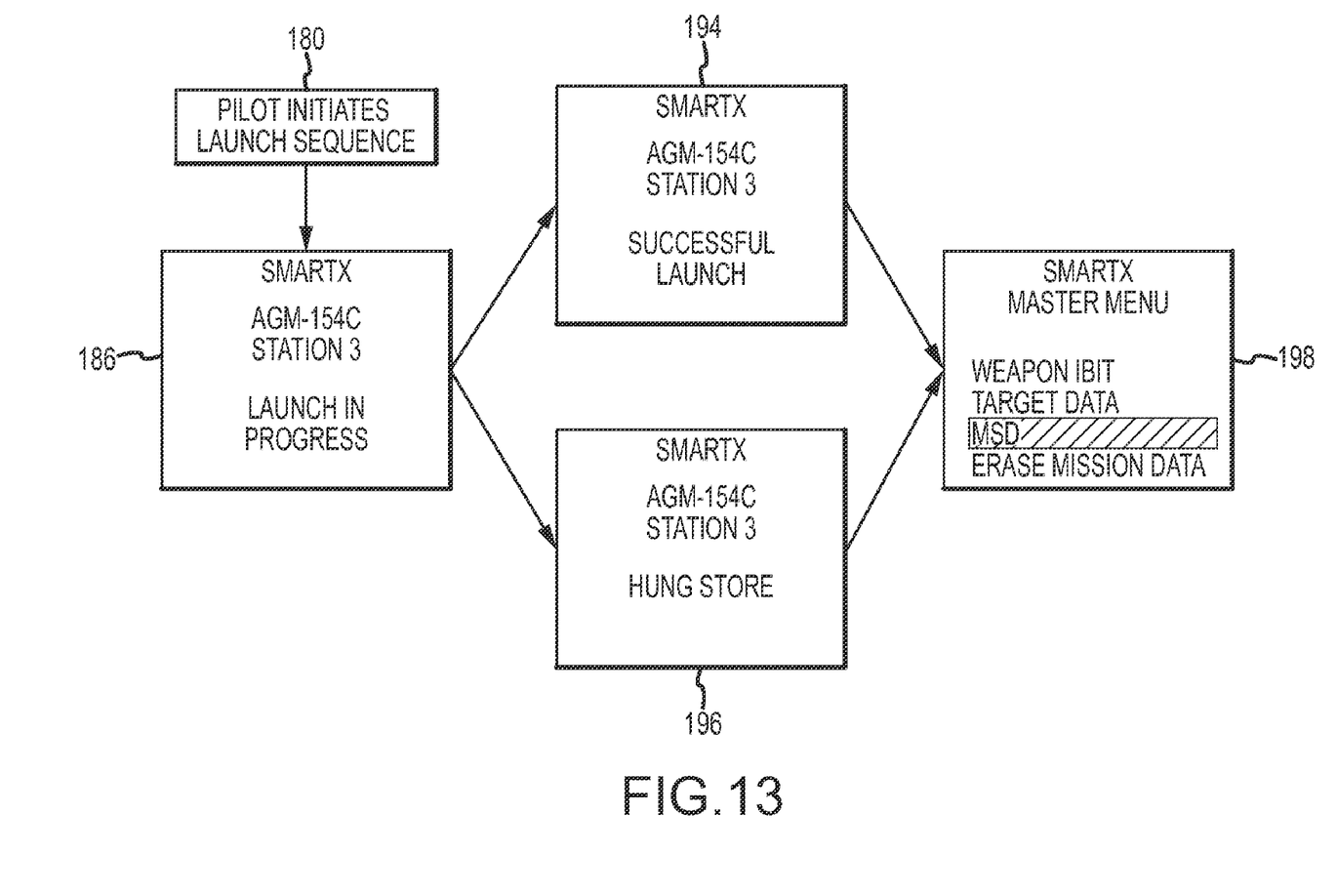

FIGS. 12 and 13 illustrate the notional sequence of events the aircrew must undertake to launch the store. SMARTX will be programmed with any optional, user-defined conditions that must be met before the store can be launched. A typical optional condition is that the store must be within range of the target (aircraft is within the store's LAR) before the launch can proceed. SMARTX will always require that the store indicates "safe to release" before allowing the launch sequence to proceed. Once the aircrew initiates the launch sequence, typically by pressing the Maverick "pickle" button on the HOTAS 180, SMARTX will detect a change in the Launch discrete input signal and evaluate the store's suitability for launch 182. If the optional and mandatory conditions for launch are not met, SMARTX will indicate LAUNCH PROHIBITED on the SMARTX display 184. If the conditions are met, SMARTX will apply Release Consent and 28V DC #2 (required to fire thermal batteries or ignite a motor) and indicate LAUNCH IN PROGRESS 186. SMARTX will now conduct the launch sequence protocol described in the store ICD and in MIL-STD-1760 to determine if the weapon indicates ready to launch 188. The maximum duration of the launch sequence 190, typically 1-3 seconds, is specified in the store ICD. If the store indicates Committed to Store Separation (CTSS), a MIL-STD-1760 defined status, within the specified duration, SMARTX will launch the weapon 192. If the store separates from the platform, as indicated to SMARTX by a correct change in Interlock status, SMARTX will change LAUNCH IN PROGRESS to SUCCESSFUL LAUNCH 194. If the store does not indicate CTSS within the specified duration, or does not indicate successful separation from the platform after launch has been attempted, SMARTX will change LAUNCH IN PROGRESS to HUNG STORE 196 on the SMARTX display. The display returns to the Main menu 198 after two seconds or, if the user prefers, after pressing the Track button.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A smart translator box for integrating existing aircraft electronics and software having an aircraft AGM-65 analog interface with a store having a MIL-STD-1760 digital interface, said smart translator box comprising:

a store AGM-65 analog interface including AC and DC power lines, a plurality of discrete input signal lines, a plurality of analog input signal lines, a plurality of discrete output signal lines and a video output signal line to communicate signals with the aircraft AGM-65 analog interface;

an aircraft MIL-STD-1760 digital interface including AC and DC power lines, signal lines including a 1760-compatible digital data bus and discrete lines to communicate control signals and data with the store MIL-STD-1760 digital interface;

a channel to pass AC and DC power from the AC and DC power lines at the store AGM-65 analog interface to the AC and DC power lines at the aircraft MIL-STD-1760 digital interface to power the store and to power the smart translator box electronics;

a discrete-to-digital converter that converts signals on the discrete input signal lines at the store AGM-65 interface to aircraft digital signals, said signals being responsive to aircraft software and aircrew menu selection of a displayed video signal to authorize the smart translator box to operate, to initiate a launch sequence of the store or to communicate a menu selection;

an analog-to digital converter that converts signals on the analog signal lines at the store AGM-65 to aircraft digital signals, said signals being in response to aircrew manipulation of a control mechanism to scroll the menu or to increment or decrement the value of selected data fields on the menu;

a processor configured to process the aircraft digital signals and the store control signals and data including store status and situational awareness to generate text and graphics digital signals, first control and data digital signals output on the 1760-compatible digital data bus and second and third control digital signals;

a text and graphics video generator that processes the text and graphics digital signals and generates a video signal on the store AGM-65 interface video output, said video signal being displayed to the aircrew in the aircraft cockpit;

a digital-to-discrete converter that processes the second control digital signals to generate signals on the discrete output signal lines at the store AGM-65 interface, said signals communicating to the aircraft software that an approved store is attached and providing its operational status; and a bi-directional digital-to-discrete converter that processes the third control digital signals to generate release consent and interlock signals on the discrete lines at the aircraft MIL-STD-1760 compliant interface and processes a discrete interlock return signal to generate a digital interlock return signal communicated to the processor.

2. The smart translator box of claim 1, further comprising:

an AGM-65 mating connector wired to the store AGM-65 analog interface for connection to the AGM-65 analog interface on an aircraft; and a MIL-STD-1760 mating connector wired to the aircraft MIL-STD-1760 digital interface for connection to the MIL-STD-1760 digital interface on the store.

3. The smart translator box of claim 2, wherein the smart translator box communicates with the aircraft AGM-65 interface with signals specified by its interface control document (ICD) without modification to the aircraft's electronics or software and communicates with the store MIL-STD-1760 interface with signals specified by its interface control document (ICD) without modification to the store's electronics and software.

4. The smart translator box of claim 1, wherein the MIL-STD-1760 compatible digital data bus comprises at least one of a MIL-STD-1553 compatible data bus and a fibre channel.

5. The smart translator box of claim 1, wherein the video signal includes the status and situational awareness data that is uploaded from the store.

6. The smart translator box of claim 5, wherein the video signal includes a mission status display that shows a launch acceptability region.

7. The smart translator box of claim 1, wherein said aircraft MIL-STD-1760 digital interface further includes high or low bandwidth lines to receive the video signal from the store, said box further comprising a video switch having a first input coupled to said low and high bandwidth lines and a second input coupled to the text and graphics video generator and an output coupled to the video output signal line, said processor configured to recognize stores that generate the video signal and control the video switch to port the video signal directly from the store to the aircraft.

8. The smart translator box of claim 1, further comprising a GPS navigation system that tracks the position, velocity and attitude of the aircraft.

9. The smart translator box of claim 8, wherein said processor processes the position, velocity and attitude to generate GPS navigation data that is provided to the store, said store returning the situational awareness data that is integrated into the text and graphics digital signals in the video signal.

10. The smart translator box of claim 8, wherein the aircraft is not GPS equipped, said box providing GPS navigation including a moving map display in said video signal.

11. The smart translator box of claim 1, wherein no store is attached to the aircraft.

12. The smart translator box of claim 1, wherein the aircraft MIL-STD-1760 digital interface is Universal Armament Interface (UAI).

13. A smart translator box for integrating existing aircraft electronics and software having an aircraft AGM-65 analog interface with a store having a MIL-STD-1760 digital interface, said smart translator box comprising:

a store AGM-65 analog interface including AC and DC power lines, a plurality of discrete input signal lines, a plurality of analog input signal lines, a plurality of discrete output signal lines and a video output signal line to communicate signals with the aircraft AGM-65 analog interface;

an aircraft MIL-STD-1760 digital interface including AC and DC power lines, signal lines including a 1760-compatible digital data bus and discrete lines to communicate control signals and data with the store MIL-STD-1760 digital interface;

a channel to pass AC and DC power from the AC and DC power lines at the store AGM-65 analog interface to the AC and DC power lines at the aircraft MIL-STD-1760 digital interface to power the store and to power the smart translator box electronics;

a discrete-to-digital converter that converts signals on the discrete input signal lines at the store AGM-65 interface to aircraft digital signals;

an analog-to digital converter that converts signals on the analog signal lines at the store AGM-65 to aircraft digital signals;

a processor configured to process the aircraft digital signals and the store control signals and data to generate text and graphics digital signals, first control and data digital signals output on the 1760-compatible digital data bus and second and third control digital signals;

a text and graphics video generator that processes the text and graphics digital signals and generates a video signal on the store AGM-65 interface video output;

a digital-to-discrete converter that processes the second control digital signals to generate signals on the discrete output signal lines at the store AGM-65 interface; and a bi-directional digital-to-discrete converter that processes the third control digital signals to generate signals on the discrete lines at the aircraft MIL-STD-1760 compliant interface and processes a discrete return signal to generate a digital return signal communicated to the processor.

14. The smart translator box of claim 13, wherein the smart translator box communicates with the aircraft AGM-65 interface with signals specified by its interface control document (ICD) without modification to the aircraft's electronics or software and communicates with the store MIL-STD-1760 interface with signals specified by its interface control document (ICD) without modification to the store's electronics and software.

15. A smart translator box for integrating existing aircraft electronics and software having an aircraft. AGM-65 analog interface with a store having a MIL-STD-1760 digital interface, said smart translator box comprising:

a store AGM-65 analog interface including AC and DC power lines, a plurality of discrete input signal lines, a plurality of analog input signal lines, a plurality of discrete output signal lines and a video output signal line to communicate signals with the aircraft AGM-65 analog interface;

an aircraft MIL-STD-1760 digital interface including AC and DC power lines, signal lines including a 1760-compatible digital data bus and discrete lines to communicate control signals and data with the store MIL-STD-1760 digital interface;

means to pass AC and DC power from the AC and DC power lines at the store AGM-65 analog interface to the AC and DC power lines at the aircraft MIL-STD-1760 digital interface to power the store and to power the smart translator box electronics; and processor and I/O means to communicate with the aircraft AGM-65 interface with signals specified by its interface control document (ICD) without modification to the aircraft's electronics or software and communicates with the store MIL-STD-1760 interface with signals and data specified by its interface control document (ICD) without modification to the store's electronics and software to allow the aircraft to exploit the full capability of the store.

16. The smart translator box of claim 15, wherein the processor is configured to:

reinterpret the aircraft's AGM-65 analog interface standard signal package on the discrete and analog input signal lines and use them to transmit discrete signals responsive to aircraft software and aircrew menu selection of a displayed video signal to authorize the smart translator box to operate, to initiate a launch sequence of the store or to communicate a menu selection and analog signals response to aircrew manipulation of a control mechanism to scroll the menu or to increment or decrement the value of selected data fields on the menu;

process these commands and status and situational awareness data from the store to produce a video signal of text and graphics via the store AGM-65 analog interface that is displayed to the aircrew in the cockpit to emulate the standard MIL-STD-1760 store functionality;

generate discrete signals via the store AGM-65 analog interface that communicate to the aircraft software that an approved store is attached and provide its operational status; and generate digital data and discrete signals at the aircraft MIL-STD-1760 digital interface that are used to enable and control the store.

\* \* \* \* \*